United States Patent
In et al.

(10) Patent No.: US 8,391,207 B2
(45) Date of Patent: Mar. 5, 2013

(54) METHOD FOR TRANSMITTING DATA IN A RELAY SYSTEM AND SYSTEM THEREFOR

(75) Inventors: Jeong Sik In, Yongin-si (KR); Sun Gi Kim, Seoul (KR); Hyo Hyun Choi, Seoul (KR); Ju Wook Jang, Seoul (KR); Woo Kyung Sung, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 974 days.

(21) Appl. No.: 12/270,901

(22) Filed: Nov. 14, 2008

(65) Prior Publication Data

US 2009/0122747 A1 May 14, 2009

(30) Foreign Application Priority Data

Nov. 14, 2007 (KR) .................. 10-2007-0116291

(51) Int. Cl.
*H04W 4/00* (2009.01)
(52) U.S. Cl. ........................................ 370/328; 370/330
(58) Field of Classification Search .................. 370/315, 370/328, 330
See application file for complete search history.

(56) References Cited

U.S. PATENT DOCUMENTS

| 6,414,955 | B1 * | 7/2002 | Clare et al. ..................... 370/390 |
| 7,974,240 | B2 * | 7/2011 | Liu et al. ........................ 370/329 |
| 2008/0274746 | A1 * | 11/2008 | Lin et al. ....................... 455/449 |
| 2009/0268662 | A1 * | 10/2009 | Larsson et al. ................ 370/328 |

* cited by examiner

*Primary Examiner* — Sai-Ming Chan
(74) *Attorney, Agent, or Firm* — Cha & Reiter, LLC

(57) ABSTRACT

A method and system for transmitting data from a base station to a mobile station in a wireless communication system using a multiple hop relay scheme is In a multi-hop system having a plurality of nodes, performing bidirectional data transmission between the nodes comprises: grouping the plurality of nodes into a first node group to a fourth node group, and assigning data transmission intervals to the grouped node groups at each frame, the data transmission intervals dividing each frame in time; receiving, by a second group node, data from an upper group node at a first frame and, at the same time, receiving, by a third group node, data from a lower group node; and transmitting by the second group node data to the upper group node at a second frame and, at the same time, transmitting by the third group node data to the lower group node.

17 Claims, 10 Drawing Sheets

METHOD FOR TRANSMITTING DATA IN A RELAY SYSTEM AND SYSTEM THEREFOR

CLAIM OF PRIORITY

This application claims the benefit under 35 U.S.C. §119 (a) of a Korean patent application filed in the Korean Intellectual Property Office on Nov. 14, 2007 and assigned Serial No. 2007-0116291, the entire disclosure of which is hereby incorporated by reference in its entirety.

BACKGROUND OF THE INVENTION

1. Field of the Invention

The present invention relates to data transmission in a wireless communication system. More particularly, the present invention relates to technologies for transmitting data from a base station to a mobile station in a wireless communication system using a multiple hop relay scheme.

2. Description of the Related Art

With advances in technologies from $1^{st}$ generation mobile systems to $3^{rd}$ or future generation communication systems, studies related to efficient operations and improved throughput of the system have been performed to realize high-speed transmission and satisfaction of user demand. The studies for efficient operations and improved throughput of the system included a multi-hop transmission scheme, which is an extension beyond a conventional single-hop transmission scheme which only a direct transmission from a Base Station (BS) to a Mobile Station (MS) is allowed. In a system supporting a multi-hop relay scheme, a signal can be transmitted from a BS to a MS via a Relay Station (RS), or directly transmitted to the MS. The system supporting the single-hop transmission scheme has a structure in which a BS exists in each cell, and directly connects to an MS without one or more repeaters (i.e. RSs.)

On the other hand, the system supporting the multi-hop transmission scheme has a structure in which one or more RSs are arranged in each cell between the BS and the MS. The RS repeats a signal from the BS to the MS so as to improve reception signal performance of the MS particularly in a cell boundary area or a shadow area. In other words, by using the RS, MSs in the shadow area can successfully receive signals from the BS. The shadow area comprises an area where communication between the BS and the MS is almost impossible. In the latter multi-hop system, a single cell may be comprised of one BS, one or more RSs, and one or more MSs. Using the one or more RSs in one cell has an advantage to over the drawbacks of installing an additional BS in the cell. For example, the RS can be installed less expensively than installing the BS. The RS generally transmits signals from a BS to an MS by merely amplifying signals received from the BS and by transmitting the signals to the MS or another RS, or by transmitting signals to the MS or another RS after decoding signals received from the BS, detecting errors in the signals, and then re-encoding the signals at the RS.

In the meanwhile, a signal from the RS can be received by an unintentional destination, e.g. an MS or another RS, because RSs are installed so as to keep a distance long enough to prevent an interference noise from occurring. In such a case, the signal received at the unintentional destination can make a noise in communication, which results in deteriorating overall throughput of the system. Such a case is below explained with reference to FIG. 1.

FIG. 1 illustrates data transmission in a conventional wireless communication system. Referring now to FIG. 1, a first frame 101, a second frame 102, a third frame 103, and a fourth frame 104 each indicate a time interval in which a BS, at least one RS, and at least one MS, transmit and receive data. In the frames 101 to 104, Node 0 (N0) 111, 121, 131 and 141 indicates a BS; Node 1 (N1) 113, 123, 133 and 143, Node 2 (N2) 115, 125, 135 and 145, Node 3 (N3) 117, 127, 137 and 147, and Node 4 (N4) 119, 129, 139 and 149 each indicate an RS; and Node 5 (N5) 120, 130, 140 and 150 indicates an MS. In the first frame 101, N0 111, N2 115 and N4 119 become transmitters, and N1 113, N3 117 and N5 120 become receivers.

In the first frame 101, the transmitters simultaneously transmit data to the receivers, that is, N0 111, N2 115 and N4 119 simultaneously transmit data to N1 113, N3 117 and N5 120, respectively.

In the second frame 102, conversely, N1 123, N3 127 and N5 130 become transmitters, and N0 121, N2 125, and N4 129 become receivers, and N1 123, N3 127 and N5 130 simultaneously transmit data to N0 121, N2 125, and N4 129, respectively.

In the third frame 103, in order to forward data received at the first frame 101, N1 133 and N3 137 become transmitters, and N2 135 and N4 139 become receivers. In the third frame 103, N1 133 and N3 137 simultaneously transmit data to N2 135 and N4 139, respectively.

In the fourth frame 104, in order to forward data received at the second frame 102, N2 145 and N4 149 become transmitters and N1 143 and N3 147 become receivers. In the fourth frame 104, N2 145 and N4 149 simultaneously transmit data to N1 143 and N3 147, respectively. However, the aforementioned transmission can cause noises in receiving data at each node, which is described below in detail referring to FIG. 2.

FIG. 2 illustrates an example of causing noises at the first frame 101 by transmission of neighboring nodes. Referring now to FIG. 2, it is assumed that at the first frame 101, N0 111 and N2 115 transmit data to N1 113 and N3 117, respectively, and N1 113 and N3 117 receive data from N0 111 and N2 115, respectively. It is also assumed that Range 210 is an area where data transmitted from N0 111 reaches, and Range 220 is an area where data transmitted from N2 115 reaches. When N0 111 and N2 115 simultaneously transmit data to N1 113 and N3 117, respectively, at a predetermined time interval, the receiver N1 113 is located within an overlapped region 230 of Ranges 210 and 220. N1 113 receives data from N2 115 as well as N0 111. Accordingly, data from N2 115 intended for N3 117 may cause noise in communication between N0 111 and N1 113. As stated above, data transmission of neighboring nodes, especially of RSs, may cause noises because of their geographic proximity, resulting in deteriorating overall throughput of the wireless communication system. Therefore there is a need for transmitting data while reducing interference noise at nodes such as a BS and an RS.

SUMMARY OF THE INVENTION

The present invention provides a method and system for controlling a transmission order of stations and transmitting data in a system having at least one relay station between a base station and a mobile station.

In accordance with an exemplary aspect of the present invention, a method for transmitting data in a multi-hop system having a plurality of nodes and performing bidirectional data transmission between the nodes comprises: receiving, at a first node of the plurality of nodes, data from an upper node at a first frame and, at the same time, receiving, at a second node of the plurality of nodes, data from a lower node, wherein the first node and the second node are located within a transmission range of both the upper node and the lower node; and transmitting, at the first node, data to the upper node at a second frame and, at the same time, transmitting, at the second node, data to the lower node.

In accordance with another exemplary aspect of the present invention, a method for transmitting data in a multi-hop system having a plurality of nodes and performing bidirectional data transmission between the nodes comprises: grouping the plurality of nodes into a first node group to a fourth node group, and assigning data transmission intervals to the grouped node groups at each frame, the data transmission intervals dividing each frame in time; receiving, at least one second node of the second node group (hereinafter "a second group node"), data from an upper group node at a first frame and, at the same time, receiving, at least one third node of the third node group (hereinafter "a third group node") data from a lower group node, the upper group node of the second group node being at least one first node of the first node group (hereinafter "a first group node"), and the lower group node of the third group node being at least one fourth node belonging to the fourth node group (hereinafter "a fourth group node"), and the second group node and the third group node being located within a transmission range of both the upper group node and the lower group node; and transmitting, at the second group node, data to the first group node at a second frame and, at the same time, transmitting, at the third group node, data to the fourth group node.

In accordance with another exemplary aspect of the present invention, the method further comprises transmitting, at the second group node, data to the third group node at a third frame and, at the same time, transmitting, at the first group node, data to an upper group node; receiving, at the third group node, data from the second group node at the third frame and, at the same time, receiving, at the fourth group node, data from a lower group node, the third group node being located outside the transmission range of the first group node, and the fourth group node being located outside the transmission range of the second group node; transmitting, at the third group node, data to the second group node at a fourth frame and, at the same time, transmitting, at the fourth group node, data to the lower group node; and receiving, at the second group node, data from the third group node at the fourth frame and, at the same time, receiving, at the first group node, data from the upper group node, the second group node being located outside the transmission range of the fourth group node, and the first group node being located outside the transmission range of the third group node.

In accordance with still another exemplary aspect of the present invention, a multi-hop system having a plurality of nodes, and performing bidirectional data transmission between the nodes comprising: a first node of the plurality of nodes; and a second node of the plurality of nodes, wherein the first node receives data from an upper node at a first frame and, at the same time, the second node receives data from a lower node, the first node and the second node being located within a transmission range of both the upper node, and the first node transmits data to the upper node at a second frame and, at the same time, the second node transmits data to the lower node.

In accordance with still another exemplary aspect of the present invention, a multi-hop system having a plurality of nodes and performing bidirectional data transmission between the nodes comprising: a first group node of a node group grouped by $4n^{th}$ nodes (where n is a natural number equal to or greater than 0) among the plurality of nodes; a second group node of a node group grouped by $4n+1^{th}$ nodes and being a lower group node of the first group node; a third group node of a node group grouped by $4n+2^{th}$ nodes, being a lower group node of the second group node, the second group node and the third group node being located within a transmission range of both the first group node and the fourth group node; and a fourth group node of a node group grouped by $4n+3^{th}$ nodes and being a lower group node of the third group node; wherein the second group node receives data from the first group node at a first frame and, at the same time, the third group node receives data from the fourth group node, wherein the second group node transmits data to the first group node at a second frame and, at the same time, the third group node transmits data to the fourth group node, and wherein each of the frames is divided into data transmission intervals in time.

The above-mentioned characteristics and technical advantages of the exemplary aspects of the present invention have been widely and briefly described so that any person skilled in the art can easily understand the present invention from the following description of exemplary embodiments of the present invention. Therefore, additional characteristics and technical advantages of the present invention that define features of claims of the present invention will be easily understood together with the above-mentioned ones.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent from the following detailed description taken in conjunction with the accompanying drawings, in which.

DETAILED DESCRIPTION

Figure 1:
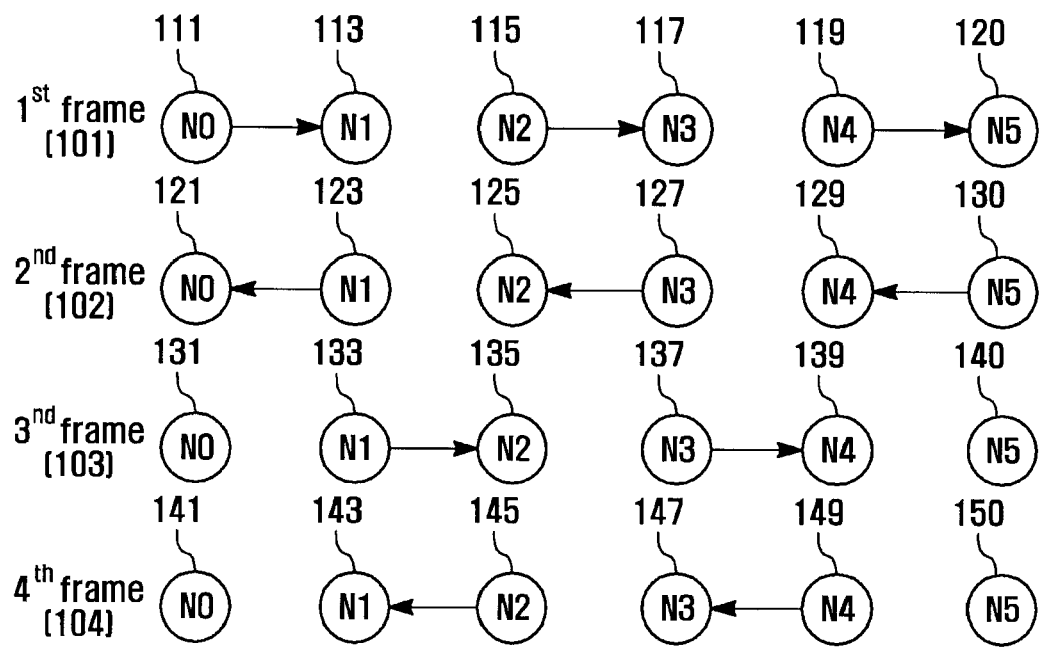
FIG. 1 illustrates data transmission in a conventional wireless communication system.
Figure 2:
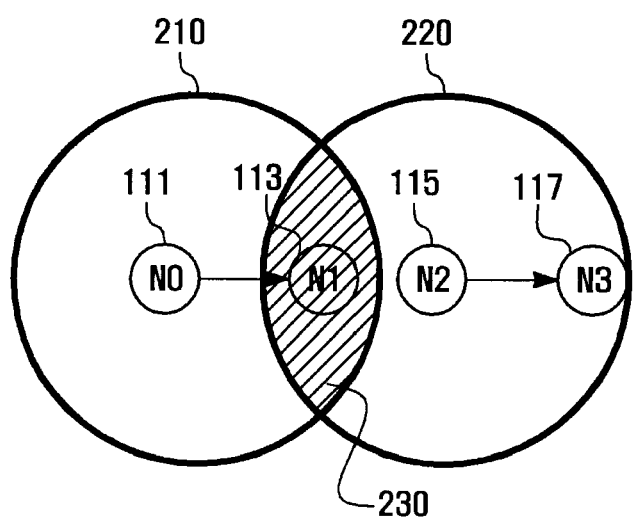
FIG. 2 illustrates an example of noise at a first frame by transmission of neighboring nodes.

The following description, with reference to the accompanying drawings, is provided to assist a person of ordinary skill in the art in a comprehensive understanding of exemplary embodiments of the invention as defined by the claims and their equivalents. The description includes various specific exemplary details to assist in that understanding, but these are to be regarded as merely exemplary for purposes of illustration. Accordingly, those of ordinary skill in the art will recognize that various changes and modifications of the exemplary embodiments described herein can be made without departing from the scope and spirit of the invention. The meaning of specific terms or words used in the specification and the claims should not be limited to the literal or commonly employed sense, but should be construed in accordance with the spirit of the invention. Also, detailed descriptions of well-known functions and constructions may be omitted for clarity and conciseness when their inclusion could obscure appreciation of the subject matter of the present invention by an artisan.

In the exemplary embodiments of the invention, it is noted that a node may comprise any one of a base station, a relay station relaying data, and a mobile station.

In a wireless communication system comprising a Base Station (BS) and at least one Mobile Station (MS) within coverage of the BS, the BS should maintain communication with all of the MSs. If an MS within the coverage is in a bad (poor) channel condition, it is difficult to provide the MS with a good quality of services from the BS. This poor channel condition results in a degradation of the quality of services. The greater the quantity of MSs that exist in a poor channel condition coverage area, the greater the overall throughput of the system deteriorates. It is important to guarantee a certain level of channel condition even for an MS under a poor channel condition in order to improve overall throughput of the system. The MS under the poor channel condition relates to a shadow area, and accordingly, guaranteeing a certain level of a channel condition may be achieved by removing the shadow area to enable maintenance of communication between the BS and all of the MSs within its coverage. A multi-hop system in which at least one RS equipped with relay function is installed between a BS and at least one MS is provided so as to extend a service coverage of the BS and to increase data transmission rate between nodes. Usually the at least one RS plays a role of receiving data from the BS and then forwarding the data to another RS or to an MS. A poor channel condition between the BS and the MS, for example due to an obstacle such as a building or due to decreased power strength resulting from a great distance between the BS and the MS, can thereby be improved.

An international standardization organization, the Institute of Electrical and Electronics Engineers (IEEE) 802.16 group, has proposed IEEE 802.16j of air interface for fixed and mobile broadband wireless access systems, which aims to enhance overall throughput of the system by installing at least one RS between a BS and MSs. A frame structure suggested in the IEEE 802.16j comprises an Access zone in which a BS or an RS communicates with an MS, and a Relay zone in which a BS communicates with an RS or an RS communicates with another RS. For simplicity in explanation, controlling a transmission order only at the Relay zone is described below as an example.

Figure 3:
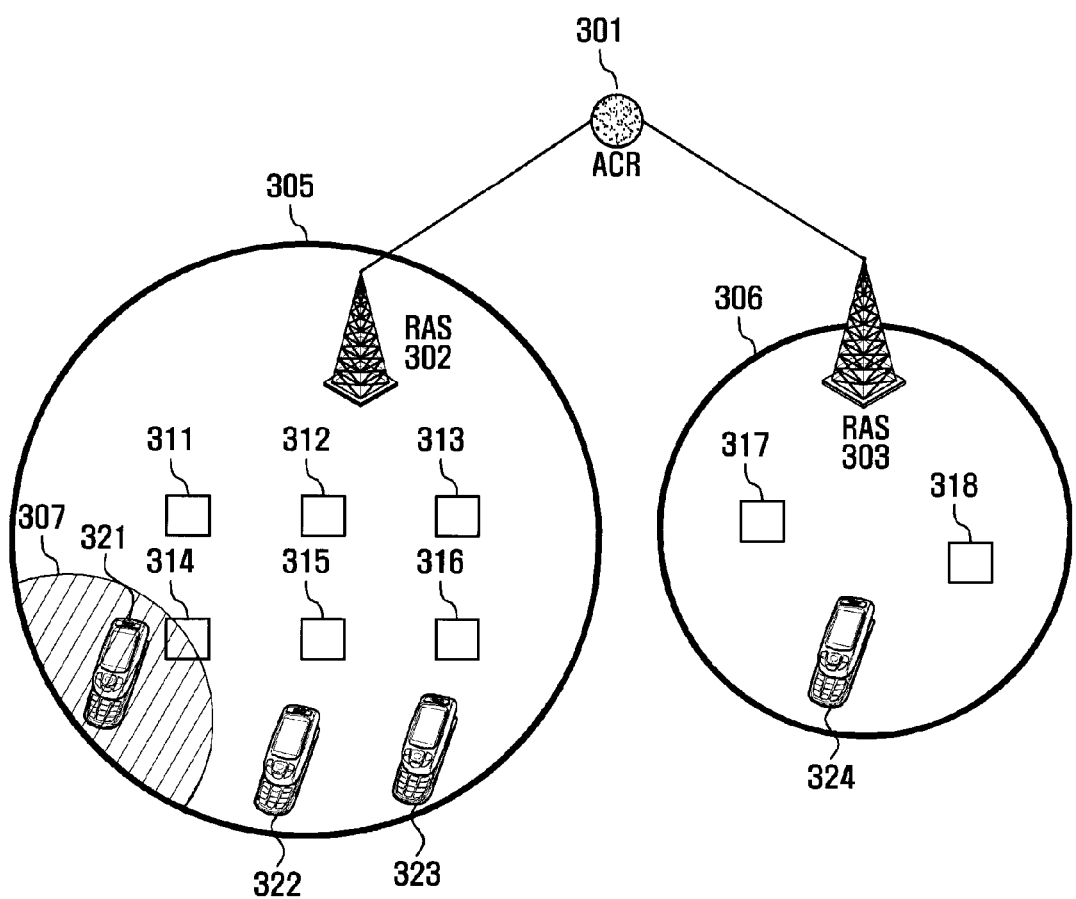
FIG. 3 illustrates a configuration of a wireless communication system to which the present invention can be applied.

FIG. 3 illustrates a configuration of a wireless communication system to which the present invention may be applied. For the sake of convenience in explanation, an example of an IEEE 802.16 based multi-hop system is described as the wireless communication system in FIG. 3, however it should be understood that the system to which the presently claimed invention is applied is not limited to the IEEE 802.16 based multi-hop system.

Referring to FIG. 3, the wireless communication system may comprise an access control router (ACR) 301, a first radio access station (RAS) 302, a second radio access station (RAS) 303, a plurality of RSs 311 to 318, and a plurality of MSs 321 to 324. RAS 302 and RAS 303 belong to BSs, and hereinafter RAS 302 and RAS 303 are referred to as BS 302 and BS 303, respectively. Range 305 indicates a region within coverage of BS 302, and Range 306 indicates a region within coverage of BS 303. Range 307 indicates a shadow area where reception power strength is weak. ACR 301 may configure a single Internet Protocol (IP) subnetwork with being connected to a plurality of BSs. ACR 301 may perform IP multicasting, authentication needed for services and mobility to users, Foreign Agent authentication, and control of access to services and Quality of Service. ACR 301 may also perform functions associated with Authentication, Authorization and Accounting (AAA) for service charging. BS 302 and BS 303 wirelessly communicate with MSs 321 to 324 controlling radio resources. RSs 311 to 318 forward data received from a BS or an MS to another RS or the MS at a predetermined time interval of the frame. In particular, RS 314 forwards data transmitted from BS 302 to MS 321 located in the shadow area 307. By using the RS, data from the BS can be successfully transmitted to the MS in the shadow area, and accordingly, problems caused by the shadow area can be solved, thereby improving throughput of the system.

BS 302, RSs 311 to 316, and MSs 321 to 323 located in Range 305 and belonging to BS 302, have the same time interval of a frame for transmission/reception of data. BS 303, RSs 317 and 318, and MS 324 located in Range 306 and belonging to BS 303, have the same time interval of another frame for transmission/reception of data. If it is assumed that an interval between one device and another device is one hop, in a one-hop environment a BS and an MS are directly connected to each other without any RS between the BS and the MS, and in a multi-hop environment the BS and the MS are connected via at least one RS between the BS and the MS. In the multi-hop environment, the RS transmits and receives data at a Relay zone according to the frame structure of the IEEE 802.16j.

Generally, the RS can not transmit and receive data simultaneously. At the Relay zone data is transmitted or received via the RS(s) from the BS to the MS and vice versa using a Time Division Duplex (TDD) scheme, which divides duration for transmission and reception on a time basis, or using Frequency Division Duplex (FDD) scheme, which divides the duration on a frequency basis. Hereinafter, for simplicity it is described that data is transmitted or received by the TDD scheme.

In a system applying the TDD scheme, a BS and RSs in a state of transmission can only transmit data, the BS and RSs in a state of reception can only receive data. That is, if nodes are in the state of transmission, the nodes transmit data simultaneously, and if nodes are in the state of reception, the nodes receive data simultaneously. Data transmission time is therefore shortened and thereby throughput of the system is enhanced. Accordingly, the present invention provides a frame structure that provides such advantages and solves problems caused by the conventional data transmission scheme. Hereinafter, the present invention is further described in detail referring to the drawings.

Figure 4:
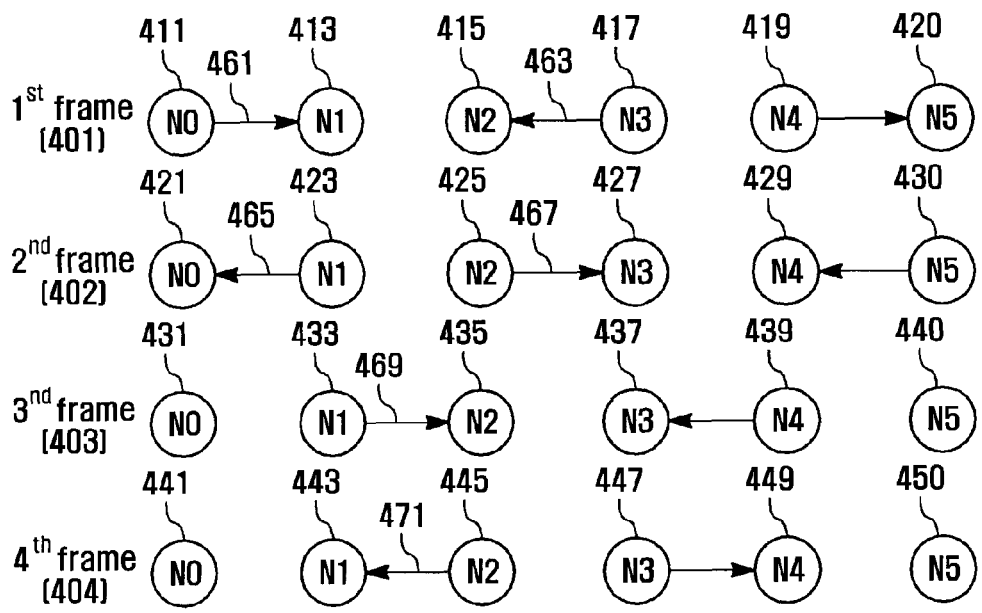
FIG. 4 illustrates a frame structure of data transmission according to an exemplary embodiment of the present invention.

FIG. 4 illustrates a frame structure of data transmission according to an exemplary embodiment of the present invention.

Referring to FIG. 4, First frame 401, Second frame 402, Third frame 403, and Fourth frame 404 each indicate a time interval in which a BS, at least one RS, and at least one MS transmit and receive data. In FIG. 4, Nodes, N0 to N5 are nodes of a BS, RSs, and MSs. For example, Node 0 (N0) 411, 421, 431 and 441 may indicate the BS; Node 1(N1) 413, 423, 433 and 434, Node 2(N2) 415, 425, 435 and 445, Node 3(N3) 417, 427, 437 and 447, and Node 4(N4) 419, 429, 439 and 449 may each indicate the RS; and Node 5(N5) 420, 430, 440 and 450 may indicate an MS. For simplicity, however, it is assumed that Node O(N0) 411, 421, 431 and 441 indicates a BS, and that Node 1(N1) 413, 423, 433 and 434, Node 2(N2) 415, 425, 435 and 445, Node 3(N3) 417, 427, 437 and 447, Node 4(N4) 419, 429, 439 and 449, and Node 5(N5) 420, 430, 440, and 450 indicate a First, Second, Third, Fourth and Fifth RS, respectively. That is, only the Relay zone is depicted in FIG. 4.

With reference to in FIG. 4, a node from which an arrow starts indicates a transmitter, and a node to which an arrow points indicates a receiver. It is also assumed that in a hierarchical structure, N0 411, 421, 431 and 441 is positioned as the highest node; N1 413, 423, 433 and 443 is positioned as the node lower than N0 411, 421, 431 and 441; and N2 415, 425, 435 and 445 is positioned as the node lower than N1 413, 423, 433 and 443; N3 417, 427, 437, or 447 is positioned as the node lower than N2 415, 425, 435 and 445; N4 419, 429, 439 and 449 is positioned as the node lower than N3 417, 427, 437 and 447; and N5 420, 430, 440 and 450 is positioned as the node lower than N4 419, 429, 439 and 449, that is, as the lowest node.

Still referring to FIG. 4, a transmission order of the BS and RSs is illustrated. In the First frame 401, N0 411 transmits data to N1 413. At the same time, N3 417 and N4 419 transmit data to N2 415 and N5 420, respectively. That is, BS 411 transmits data, and at the same time, the Third RS 417 and the Fourth RS 419 transmit data. At this time, BS 411 and the Fourth RS 419 transmit data at a downlink, and the Third RS 417 transmits data at an uplink. Such a transmission order can reduce interferences caused by transmission of neighboring nodes, which is specifically described in detail later with reference to FIG. 6. Conversely, in the Second frame 402, N1 423 transmits data to N0 421. At the same time, N2 425 and N5 430 transmit data to N3 427 and N4 429, respectively. That is, the First RS 423, the Second RS 425 and the Fifth RS 430 transmit data to BS 421, the Third RS 427 and the Fourth RS 429, respectively, at the same time. At this time, the First RS 423 and the Fifth RS 430 transmit data at an uplink, and the Second RS 425 transmits data at a downlink. It should be noted that the transmission order in the First frame 401 and the transmission order in the Second frame 402 can be exchanged with each other. That is, in the First frame 401, N1 413, N2 415 and N5 420 transmit data to N0 411, N3 417 and N4 419, respectively, at the same time, and then in the Second frame, N0 421, N3 427 and N4 429 transmit data to N1 423, N2 425 and N5 430, respectively, at the same time.

In the Third frame 403, N1 433 and N4 439 transmit data to N2 435 and N3 437, respectively, at the same time. That is, the First RS 433 and the Fourth RS 439 transmit data to the Second RS 435 and the Third RS 437, respectively, at the same time. Conversely, in the Fourth frame 404, N2 445 and N3 447 transmit data to N1 443 and N4 449, respectively, at the same time. That is, the Second RS 445 and the Third RS 447 transmit data to the First RS 443 and the Fourth RS 449, respectively, at the same time.

It should be noted that the transmission order in the Third frame 403 and the transmission order in the Fourth frame 404 can be exchanged with each other in a similar manners to those in the First frame 401 and the Second frame 402. That is, at the time when a $4n^{th}$ node transmits data to a $4n+1^{th}$ node, where n is a natural number equal to or greater than 0 (that is, if n equals 0 in FIG. 4, Node 0 transmits data to Node 1 as transmission 461), a $4n+3^{th}$ node transmits data to a $4n+2^{th}$ node (if n equals 0 in FIG. 4, Node 3 transmits data to Node 2 as transmission 463). Then, in the next frame, the $4n+1^{th}$ node and the $4n+2^{th}$ node become transmitters, and at the time when the $4n+1^{th}$ node transmits data to the $4n^{th}$ node at an uplink (if n equals 0 in FIG. 4, Node 1 transmits data to Node 0 as transmission 465), the $4n+2^{th}$ node transmits data to $4n+3^{th}$ node at a downlink (if n equals 0 in FIG. 4, Node 2 transmits data to Node 3 as transmission 467). In the next frame, the $4n+1^{th}$ node becomes a transmitter, and the $4n+1^{th}$ node transmits data to the $4n+2^{th}$ node at a downlink (if n equals 0 in FIG. 4, Node 1 transmits data to Node 2 as transmission 469), and then in the next frame, the $4n+2^{th}$ node becomes a transmitter, and the $4n+2^{th}$ node transmits data to $4n+1^{th}$ node at an uplink (if n equals 0 in FIG. 4, Node 2 transmits data to Node 1 as transmission 471). By controlling uplink and downlink transmission of data in such a manner, problems of interference noises caused by the conventional transmission scheme can be solved. In the afore-mentioned system, the number of BS and RSs transmitting data in one frame is configured on a basis of 4 nodes (4n, 4n+1, 4n+2, and 4n+3) considering the efficient throughput of the system with minimizing the interference noises, but the number of nodes can be varied by use of a natural number other than 4.

Figure 5:
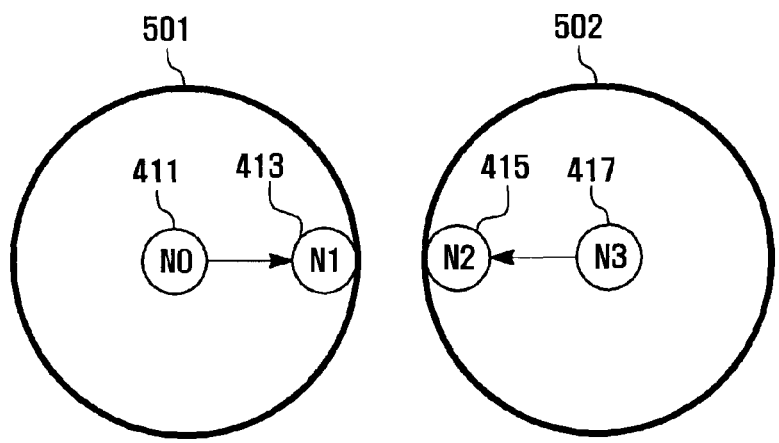
FIG. 5 illustrates transmission ranges of transmitters upon data transmission in the frame structure of FIG. 4.

FIG. 5 illustrates exemplary transmission ranges 501, 502 of transmitters upon data transmission in the frame structure of FIG. 4. Referring now to FIG. 5, in the First frame 401 of FIG. 4, Range 501 is an area within which data transmitted from N0 411 reaches and Range 502 is an area within which data transmitted from N3 417 reaches when N0 411 and N3 417 transmit data at the same time. In such a case, N1 413 is located within the Range 501 formed by the transmission from N0 411, and N2 415 is located within the Range 502 formed by the transmission from N3 417.

Accordingly, since N1 413 is located within a range different from a range within which N2 415 is located, N1 413 and N2 415 can each receive data without any interference noises caused by a transmission of N0 411 or N3 417. As shown in FIG. 5, the receivers, N1 413 and N2 415 can each be located within respective single ranges without any receiver within overlapped ranges. As the interference noise is reduced at a receiver, a data transmission rate and overall system throughput can be improved. That is, when a $4n^{th}$ node, for example RS 411, transmits data at a downlink and, at the same time, a $4n+3^{th}$ node, for example, RS 417, transmits data at an uplink, a $4n+1^{th}$ node, for example RS 413, is located within the Range 501 formed by transmission of the $4n^{th}$ node, but not within the Range 502 formed by transmission of the $4n+3^{th}$ node. Likewise, when the $4n^{th}$ node and the $4n+3^{th}$ node transmit data at the downlink at the same time, the $4n+2^{th}$ node is located within the Range 502 formed by transmission of the $4n+3^{th}$ node, but not within the Range 501 formed by transmission of the $4n^{th}$ node. The Ranges 501 and 502 as in FIG. 5 are formed in case of a transmission order as in the First frame 401 and the Third frame 403 of FIG. 4. In the Third frame 403, N2 435 and N3 437 are located within different ranges, namely a range formed by N1 433 and a range formed by N4 439, respectively. Accordingly, N2 435 and N3 437 can each receive data without any interference noise caused by a transmission of N1 433 or N4 439.

Figure 6:
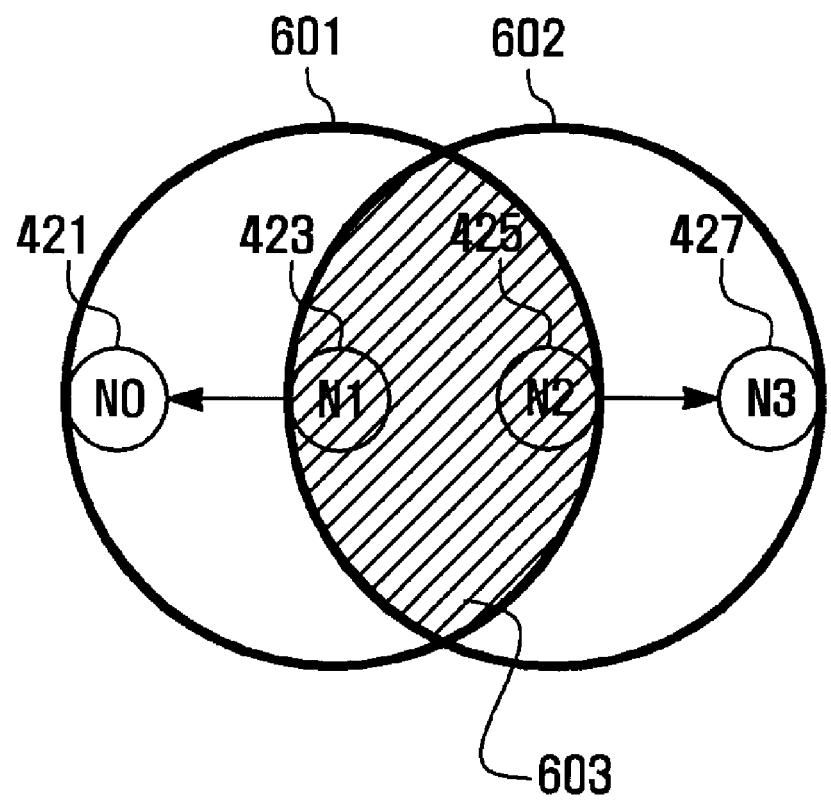
FIG. 6 illustrates further transmission ranges of transmitters upon data transmission in the frame structure of FIG. 4.

FIG. 6 illustrates further exemplary transmission ranges of transmitters upon data transmission in the frame structure of FIG. 4. Referring now to FIG. 6, in the Second frame 402 of FIG. 4, the Range 601 is an area within which data transmitted from N1 423 reaches and the Range 602 is an area within which data transmitted from N2 425 reaches when N1 423 and N2 425 transmit data at the same time. At this time, N1 423 and N2 425 are located within the same transmission range, i.e. the Range 601 and Range 602. In such a case, N0 421 and N2 425 are also located within the Range 601 formed by transmission of N1 423. Accordingly, if N2 425 becomes a receiver, N2 425 receives data interfered by transmission of N1 423. The transmission of N1 423 is an unintended data in a view of reception of N2 425, as N0 421 is the intended recipient of the transmission by N1 423. Accordingly, N2 425 is set as a transmitter in order to avoid interference noise being caused by unintended data. N0 421 and N3 427 which are set as receivers can be located within respective single ranges without either being located within an overlapped region 603 of the Range 601 and Range 602. This means that both N0 421 and N3 427 receive only intended data without any interference noise. That is, when a $4n+1^{th}$ node, for example RS 423, transmits data at an uplink and, at the same time, a $4n+2^{th}$ node, for example RS 425, transmits data at a downlink, a $4n^{th}$ node, for example RS 421 is located within the Range 601 formed by transmission of the $4n+1^{th}$ node, but not within the Range 602 formed by transmission of the $4n+2^{th}$ node. Likewise, when the $4n+1^{th}$ node and the $4n+2^{th}$ node transmit data at the downlink at the same time, the $4n+3^{th}$ node is located within the Range 602 formed by transmission of the $4n+2^{th}$ node, but not within the Range 601 formed by transmission of the $4n+1^{th}$ node. The Ranges 601 and 602 as shown in the example in FIG. 6 are formed in the case of a transmission order as in the second frame 402 and the fourth frame 404 of FIG. 4. In the fourth frame 404, since N2 445 and N3 447 are located within an overlapped range, i.e. the same transmission range, N2 445 and N3 447 are set as transmitters in order to avoid interference noise being caused by unintended data.

As described above, by controlling the transmission order of a BS and RSs so as to form a zigzag format at the downlink transmission and the uplink transmission, problems, e.g. interference noise, caused by simultaneous transmission of RSs in a conventional system having more than two hops can be solved. In general, the strength of reception power is reduced in proportion to the distance between a transmitter and a receiver, and when there are two data of different strengths, there is a higher probability that the data of the greater strength may be received at a receiver. Taking this into consideration, since a transmission scheme of the present invention gives an intended data an opportunity to be transmitted from a closer distance than an unintended data, a reception rate of an accurate data is greater than that of the conventional transmission scheme, in which the intended data and the unintended data, such as interference, are both transmitted from the same distance.

Figure 7:
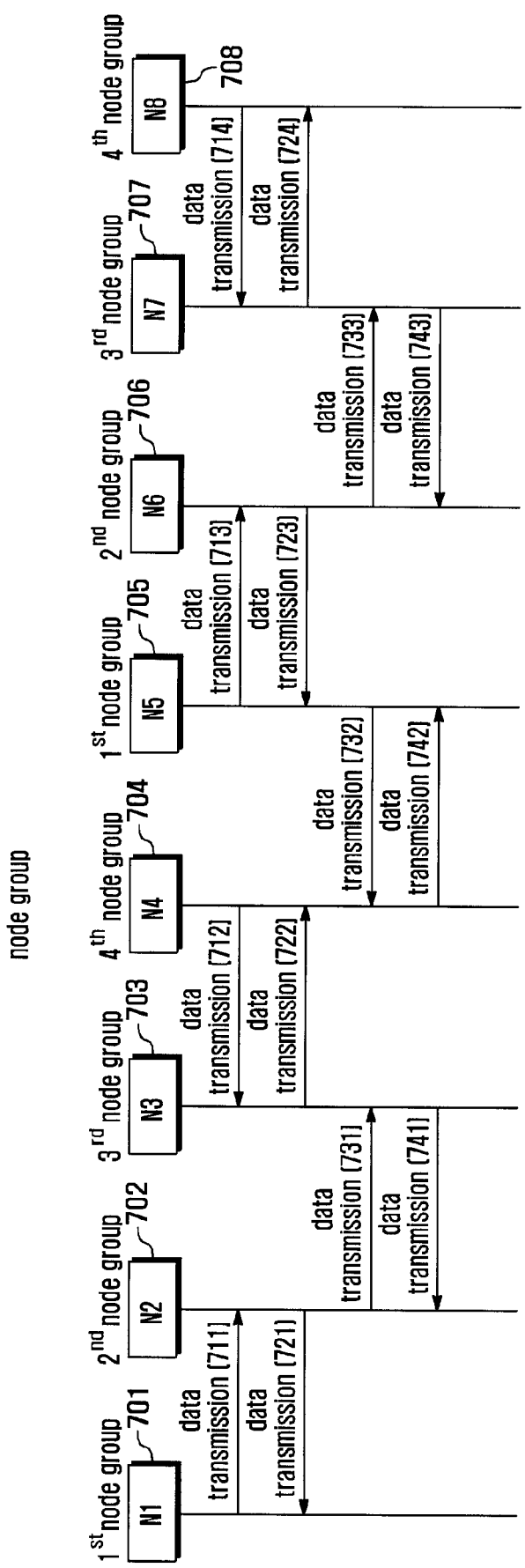
FIG. 7 illustrates a flow chart of data transmission among node groups according to the present invention.

FIG. 7 illustrates a flow chart of exemplary data transmission among four node groups according to the present invention. In FIG. 7, four nodes are grouped into a first node group to a fourth node group. That is, a $4n^{th}$ (where n is a natural number equal to or greater than 0) node is grouped into the first node group, a $4n+1^{th}$ node is grouped into the second node group, a $4n+2^{th}$ node is grouped into the third node group, and a $4n+3^{th}$ node is grouped into the fourth node group. The node is one of a BS, an RS and an MS. All nodes, i.e. BS, RSs, and MSs, that exist within a certain area controller by the BS, have common data transmission intervals dividing each frame in time. In each frame, an interval for transmission and an interval for reception are assigned to the nodes. The present invention controls the intervals for transmission to or reception from the nodes, i.e. transmission order to avoid interference noise upon receiving data at all of the nodes.

Figure 8:
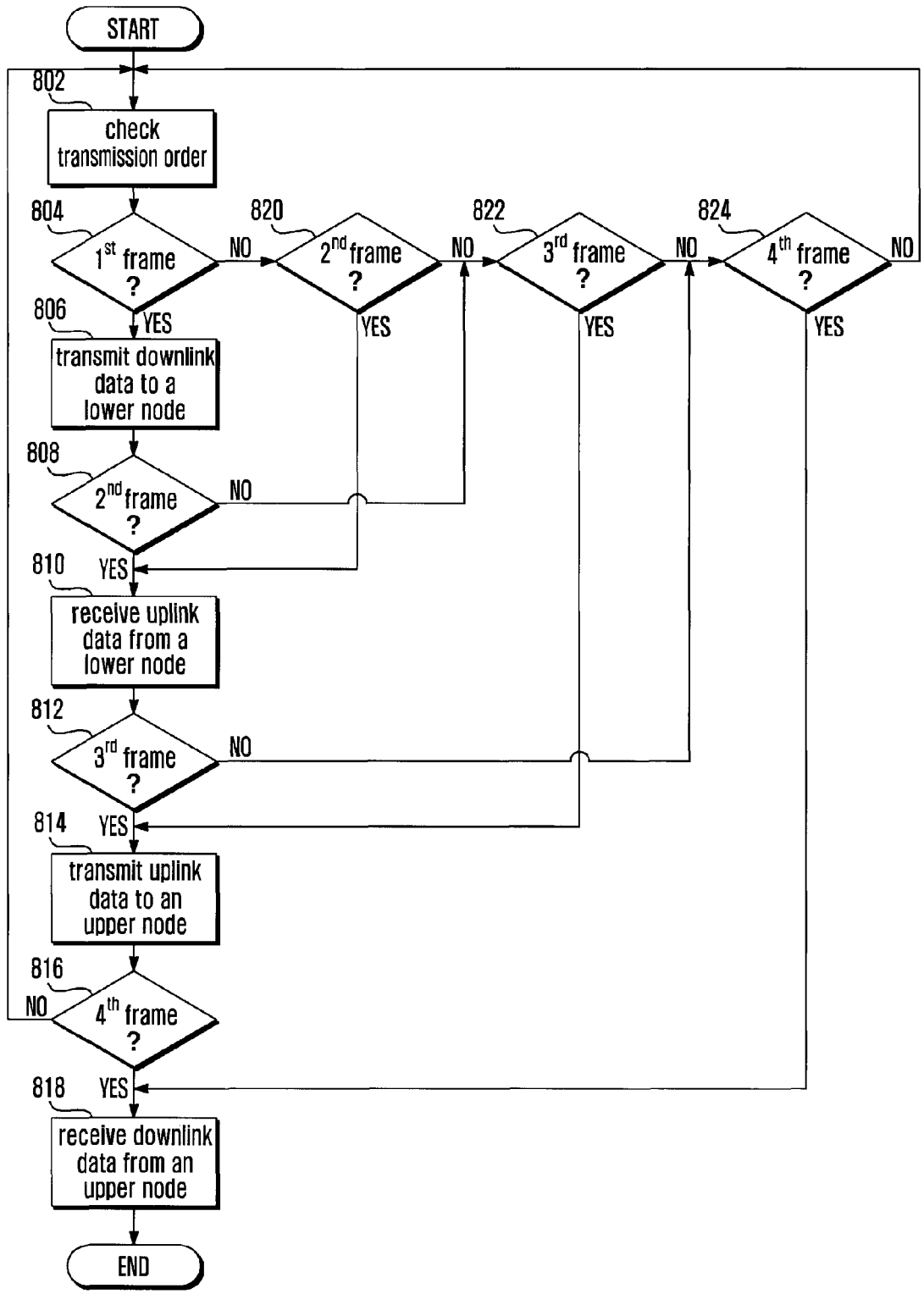
FIG. 8 illustrates a flow chart of data transmission in the first node group according to the present invention.

FIG. 8 illustrates a flow chart exemplifying data transmission in the first node group according to the present invention. It is assumed that the first node group transmits downlink data in the first frame, receives uplink data in the second frame, transmits uplink data in the third frame, and receives downlink data in the fourth frame, as shown in FIG. 7.

Referring now to FIGS. 7 and 8, the first node group, i.e. $4n^{th}$ nodes (N1 701 and N5 705), checks a transmission order of the first node group in a current frame in step 802. The first node group checks whether or not the current frame is the first frame in step 804. If the current frame is the first frame, the first node group transmits downlink data to a lower node group in step 806 as shown in steps 711 and 713 of FIG. 7. The lower node group is the second node group and, in detail, a lower node of N1 701 is N2 702, and a lower node of N5 705 is N 6 706. If the current frame is not the first frame in step 804, the first node group checks whether or not the current frame is the second frame in step 820.

If the current frame is the second frame in step 820, the first node group continues directly to step 810 and otherwise, continues directly to step 822. The first node group checks whether the current frame is the second frame in step 808, and if the current frame is the second frame, receives uplink data from the lower node group in step 810, as shown in steps 721 and 723 of FIG. 7. The first node group checks whether or not the current frame is the third frame in step 812, and if the current frame is the third frame, transmits uplink data to the upper node group in step 814, as shown in step 732 of FIG. 7. The upper node group is the fourth node group and, in detail, an upper node of N5 705 is N4 704. If the current frame is not the second frame in step 808 or 820, the first node group continues at step 822 and checks whether or not the current frame is the third frame in step 822. If the current frame is the third frame, the first node group continues directly to step 814, and otherwise, continues directly to step 824. If the current frame is not the third frame in step 812 or 822, the first node group continues to step 824, and checks whether the current frame is the fourth frame to step 824. If the current frame is the fourth frame, the first node group continues directly to step 818, and otherwise, returns to step 802. The first node group checks whether the current frame is the fourth frame in step 816, and if the current frame is the fourth frame in step 816 or 824, receives downlink data from the upper node group in step 818, as shown in step 742 of FIG. 7. If the current frame is not the fourth frame in step 816, the first node group returns to step 802.

Figure 9:
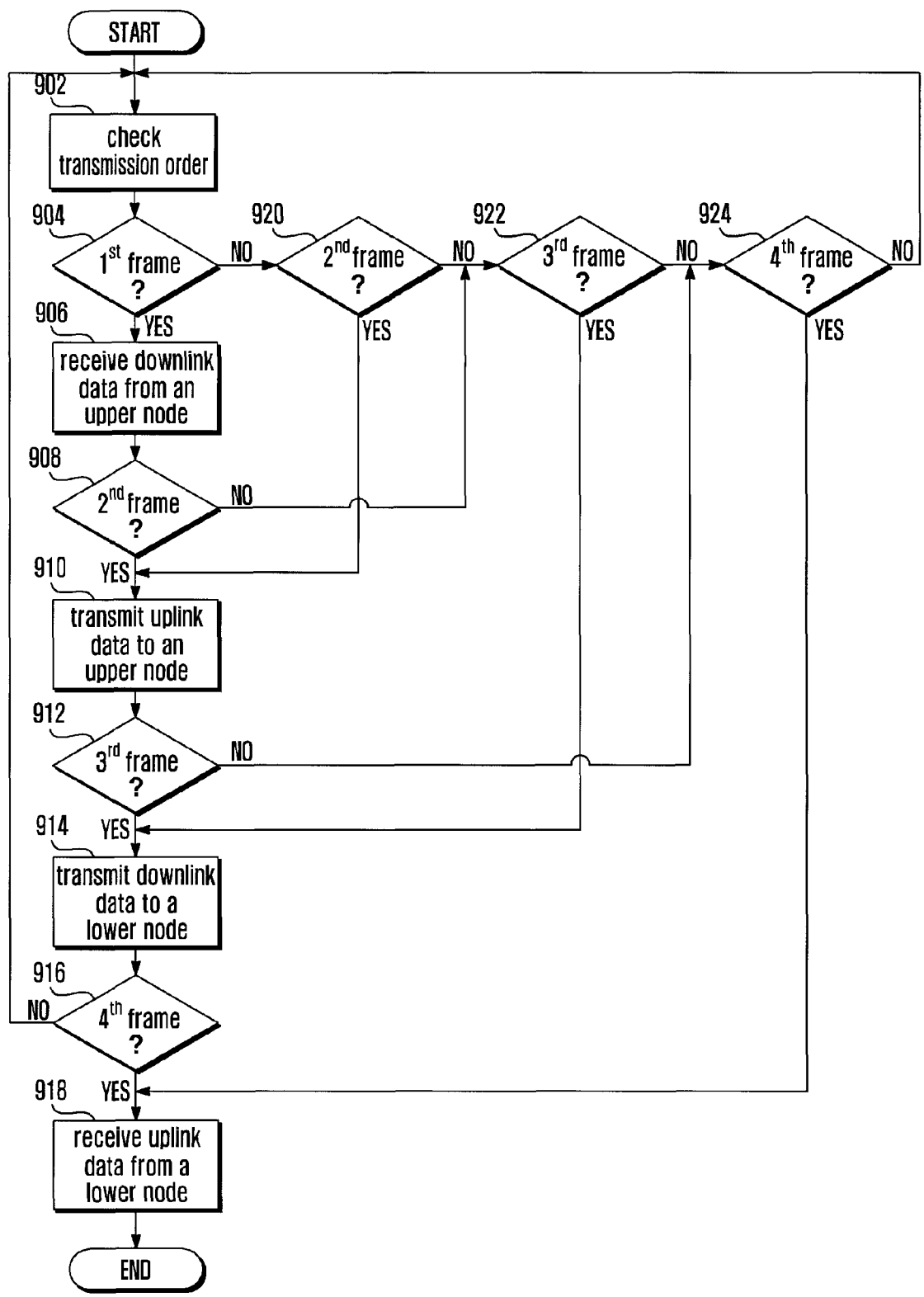
FIG. 9 illustrates a flow chart of data transmission in the second node group according to the present invention.

FIG. 9 illustrates a flow chart of data transmission in the second node group according to the present invention. It is assumed that the second node group receives downlink data in the first frame, transmits uplink data in the second frame, transmits downlink data in the third frame, and receives uplink data in the fourth frame, as shown in FIG. 7.

Referring now to FIGS. 7 and 9, the second node group, i.e. $4n+1^{th}$ nodes (N2 702 and N6 706), checks a transmission order of the second node group in a frame in step 902. The second node group checks whether or not the current frame is the first frame in step 904, and if the current frame is the first frame, receives downlink data from an upper node group in step 906, as shown in steps 711 and 713 of FIG. 7. The upper node group is the first node group and, in detail, an upper node of N2 702 is N1 701, and an upper node of N6 706 is N5 705. If the current frame is not the first frame in step 904, the second node group and checks whether or not the current frame is the second frame in step 920.

If the current frame is the second frame in step 920, the second node group continues directly to step 910, and otherwise, continues directly to step 922. The second node group checks whether the current frame is the second frame in step 908, and if the current frame is the second frame, transmits uplink data to the upper node group in step 910, as shown in steps 721 and 723 of FIG. 7. The second node group checks whether or not the current frame is the third frame in step 912, and if the current frame is the third frame, transmits downlink data to a lower node group in step 914, as shown in steps 731 and 733 of FIG. 7. The lower node group is the third node group and, in detail, a lower node of N2 702 is N3 703 and a lower node of N6 706 is N7 707. If the current frame is not the second frame in step 908 or 920, the second node group continues at step 922, and checks whether the current frame is a third frame in step 922. If the current frame is the third frame, the second node group continues at step 914, and otherwise, continues at step 924.

If the current frame is not the third frame in step 912 or 922, the second node group continues at step 924, and checks whether the current frame is the fourth frame in step 924. If the current frame is the fourth frame, the second node group continues at step 918, and otherwise, returns to step 902. The second node group checks whether the current frame is the fourth frame in step 916, and if the current frame is the fourth frame in step 916 or 924, receives uplink data from the lower node group in step 918, as shown in steps 741 and 743 of FIG. 7. If the current frame is not the fourth frame in step 916, the second node group returns to step 902.

Figure 10:
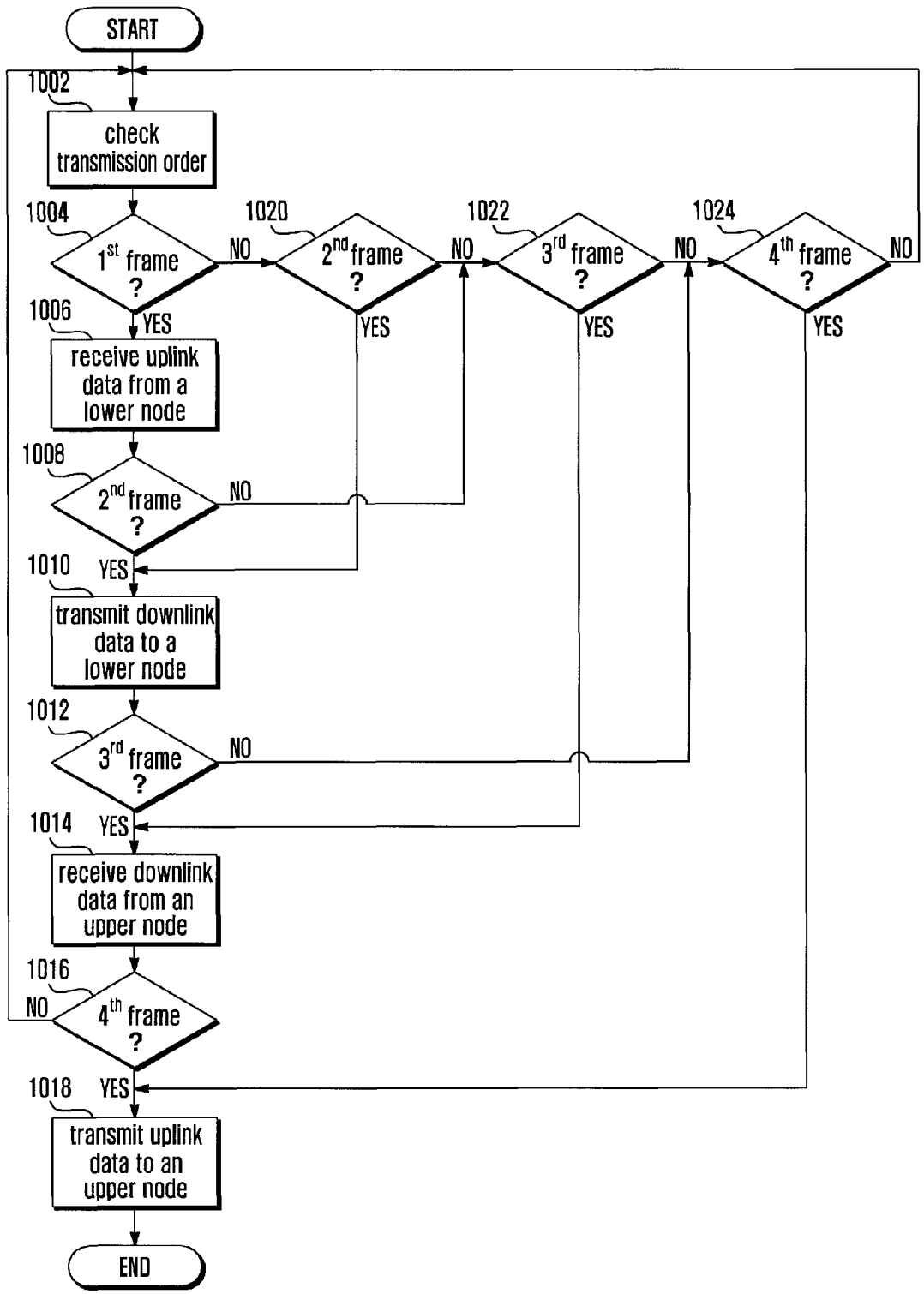
FIG. 10 illustrates a flow chart of data transmission in the third node group according to the present invention.

FIG. 10 illustrates a flow chart of exemplary data transmission in the third node group according to the present invention. It is assumed that the third node group receives uplink data in the first frame, transmits downlink data in the second frame, receives downlink data in the third frame, and transmits uplink data in the fourth frame, as shown in FIG. 7.

Referring to FIGS. 7 and 10, the third node group, i.e. $4n+2^{th}$ nodes (N3 703 and N7 707), checks a transmission order of the third node group in a frame in step 1002. The third node group checks whether or not the current frame is the first frame in step 1004, and if the current frame is the first frame, receives uplink data from a lower node group in step 1006, as shown in steps 712 and 714 of FIG. 7. The lower node group is the fourth node group and, in detail, a lower node of N3 703 is N4 704, and a lower node of N7 707 is N8 708. If the current frame is not the first frame in step 1004, the third node group checks whether or not the current frame is the second frame in step 1020.

If the current frame is the second frame in step 1020, the third node group continues directly to step 1010, and otherwise, continues directly to step 1022. The third node group checks whether or not the current frame is the second frame in step 1008, and if the current frame is the second frame, transmits downlink data to the lower node group in step 1010, as shown in steps 722 and 724 of FIG. 7. The third node group checks whether the current frame is the third frame in step 1012, and if the current frame is the third frame, receives downlink data from an upper node group in step 1014, as shown in steps 731 and 733 of FIG. 7. The upper node group is the second node group and, in detail, an upper node of N3 703 is N2 702 and an upper node of N7 707 is N6 706. If the current frame is not the second frame in step 1008 or 1020, the third node group continues at step 1022 and checks whether or not the current frame is the third frame in step 1022. If the current frame is the third frame, the third node group continues directly to step 1014, and otherwise, continues directly to step 1024.

If the current frame is not the third frame in step 1012 or 1022, the third node group continues at step 1024, and checks whether or not the current frame is the fourth frame in step 1024. If the current frame is the fourth frame, the third node group continues directly to step 1018, and otherwise, returns to step 1002. The third node group checks whether or not the current frame is the fourth frame in step 1016, and if the current frame is the fourth frame in step 1016 or 1024, transmits uplink data to the upper node group in step 1018 as shown in steps 741 and 743 of FIG. 7. If the current frame is not the fourth frame in step 1016, the third node group returns to step 1002.

Figure 11:
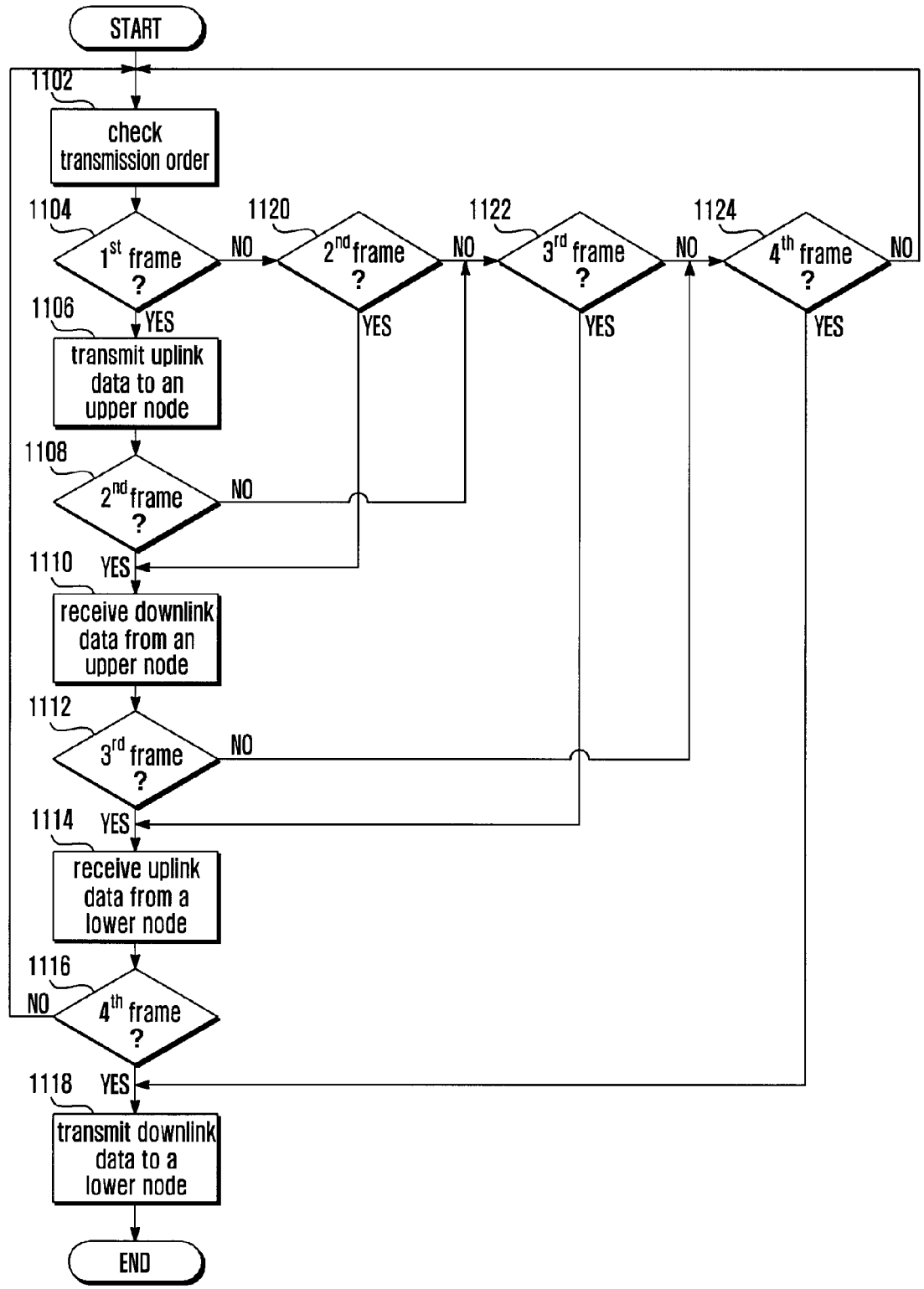
FIG. 11 illustrates a flow chart of data transmission in the fourth node group according to the present invention.

FIG. 11 illustrates a flow chart of exemplary data transmission in the fourth node group according to the present invention. It is assumed that the fourth node group transmits uplink data in the first frame, receives downlink data in the second frame, receives uplink data in the third frame, and transmits downlink data in the fourth frame, as shown in FIG. 7.

Referring to FIGS. 7 and 11, the fourth node group, i.e. $4n+3^{th}$ nodes (N4 704 and N8 708), checks a transmission order of the fourth node group in a frame in step 1102. The fourth node group checks whether or not the current frame is the first frame in step 1104, and if the current frame is the first frame, transmits uplink data to an upper node group in step 1106, as shown in steps 712 and 714 of FIG. 7. The upper node group is the third node group and, in detail, an upper node of N4 704 is N3 703, and an upper node of N8 708 is N7 707. If the current frame is not the first frame in step 1104, the fourth node group checks whether or not the current frame is the second frame in step 1120.

If the current frame is the second frame in step 1104, the fourth node group continues directly to step 1110, and otherwise, continues directly to step 1122. The fourth node group checks whether or not the current frame is the second frame in step 1108, and if the current frame is the second frame, receives downlink data from the upper node group in step 1110, as shown in steps 722 and 724 of FIG. 7. The fourth node group checks whether or not the current frame is the third frame in step 1112, and if the current frame is the third frame, receives uplink data from a lower node group in step 1114, as shown in step 732 of FIG. 7. The lower node group is the first node group and, in detail, a lower node of N4 704 is N5 705. If the current frame is not the second frame in step 1108 or 1120, the fourth node group continues at step 1122, and checks whether the current frame is the third frame in step 1122. If the current frame is the third frame, the fourth node group continues at step 1114, and otherwise, continues at step 1124.

If the current frame is not the third frame in step 1112 or 1122, the fourth node group continues at step 1124, and checks whether or not the current frame is the fourth frame in step 1124. If the current frame is the fourth frame, the fourth node group continues directly to step 1118, and otherwise, returns to step 1102. The fourth node group checks whether or not the current frame is the fourth frame in step 1116, and if the current frame is the fourth frame in step 1116 or 1124, transmits downlink data to the lower node group in step 1118, as shown in step 742 of FIG. 7. If the current frame is not the fourth frame in step 1116, the fourth node group returns to step 1102.

Figure 12:
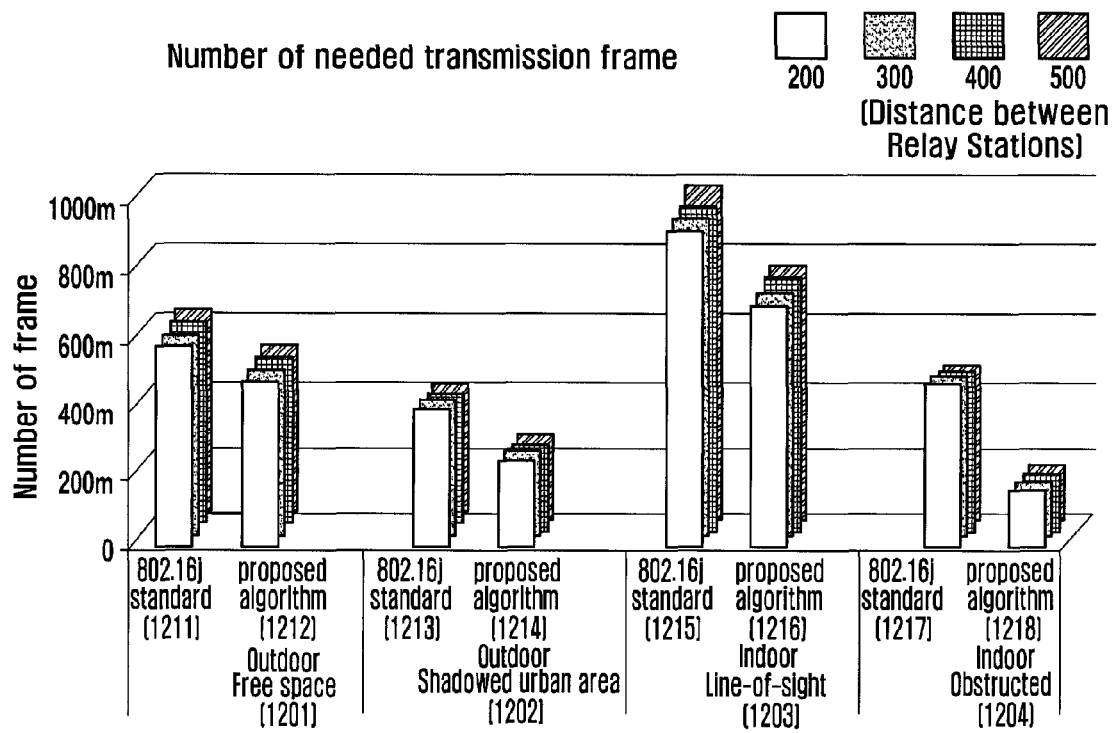
FIG. 12 is a comparison diagram illustrating the number of frames needed to transmit data according to a distance between RSs.

FIG. 12 is a comparison diagram illustrating the number of frames needed to transmit data according to a distance between RSs. FIG. 12 illustrates the number of frames needed until a total of 5000 packets are transmitted from a Base Station (BS) to the last Relay Station (RS) under condition that a maximum of 100 packets per single frame are transmitted through a radio module of a Network Simulator-2 (NS-2) applying a Shadowing model as a propagation scheme. The number of frames is the total frame number required to transmit all of the packets for distances between RSs of 200 m, 300 m, 400 m and 500 m in a multi-hop environment having 7 hops.

FIG. 12 shows the number of frames needed for data transmissions 1211, 1213, 1215 and 1217 in a system based on IEEE 802.16j as an example of a conventional scheme, and the number of frames needed for data transmissions 1212, 1214, 1216 and 1218 in a system according to the present invention. The data transmissions 1211, 1213, 1215 and 1217 and the data transmissions 1212, 1214, 1216 and 1218 are the results simulated in an environment of, respectively, outdoor free space 1201, outdoor shadowed urban area 1202, Indoor Line-of-sight 1203, and Indoor Obstructed 1204. As shown in FIG. 12, the system according to the present invention needs fewer frames to transmit 5000 packets in all of the environments 1201 to 1204 than the system based on IEEE 802.16j. That is, since the proposed system can transmit all data in fewer frames than the conventional system, the proposed system can complete transmission of desired data faster than the conventional system.

Figure 13:
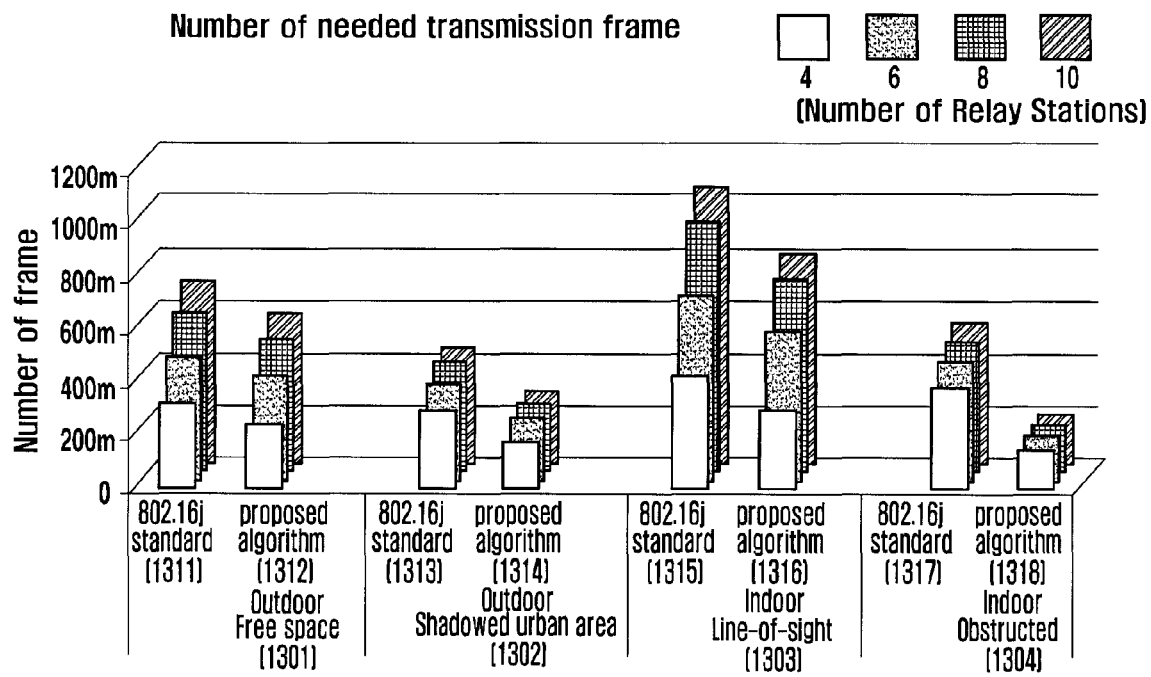
FIG. 13 illustrates a comparison diagram illustrating the number of frames needed to transmit data according to the number of RSs.

FIG. 13 is a comparison diagram illustrating the number of frames needed to transmit data according to the number of RSs. FIG. 13 illustrates the number of frames needed until a total of 5000 packets are transmitted from a Base Station to the last Relay Station under condition that a maximum of 100 packets per single frame are transmitted through a radio module of a Network Simulator-2 (NS-2) applying a Shadowing model as a propagation scheme. The number of frames is the total frame number required to transmit all of the packets for various numbers of all RSs, including a BS and the last RS, of 4, 6, 8 and 10 and with a fixed distance between RSs of 300 m.

FIG. 13 shows the number of frames needed for data transmissions 1311, 1313, 1315 and 1317 in a system based on IEEE 802.16j as an example of a conventional scheme, and the number of frames needed for data transmissions 1312, 1314, 1316 and 1318 in a system according to the present invention. The data transmissions 1311, 1313, 1315 and 1317 and the data transmissions 1312, 1314, 1316 and 1318 are the results simulated in an environment of, respectively, outdoor free space 1301, outdoor shadowed urban area 1302, Indoor Line-of-sight 1303, and Indoor Obstructed 1304. As shown in FIG. 13, the system according to the present invention needs fewer frames to transmit 5000 packets in all of the environments 1301 to 1304, than does the system based on IEEE 802.16j. That is, since the proposed system can transmit all data in fewer frames than the conventional system, the proposed system can complete transmission of desired data faster than the conventional system.

As shown in FIGS. 12 and 13, a data transmission scheme according to the present invention can transmit all desired data in fewer frames than the conventional data transmission scheme. That is, the present invention can reduce data transmission time. By reducing interference noise in data transmission and thereby improving the quality of signal transmission, the data transmission rate is increased and more packets per single frame are transmitted. For a predetermined number of packets to be transmitted, the lower the interference noise environment, the fewer frames needed to transmit the packets. Therefore the predetermined number of packets can be transmitted faster in the proposed scheme than in the conventional scheme with maintaining the quality of signal transmission. The present invention therefore achieves improved throughput of the overall system.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims and their equivalents.

What is claimed is:

1. A method for transmitting data in a multi-hop system having a plurality of nodes and performing bidirectional data transmission between the nodes, said method comprising the steps of:

receiving, by a first node of a plurality of nodes, data from an upper node at a first frame and, at the same time, receiving, by a second node of the plurality of nodes at the first frame, data from a lower node, wherein the first node and the second node are positioned within a transmission range of both the upper node and the lower node; and transmitting, by the first node, data to the upper node at a second frame and, at the same time, transmitting, by the second node, data to the lower node and wherein the first node and second node are adjacently located to each other and within respective single ranges of transmission of the upper node and the lower node, without being located in an overlapping reception region.

2. The method of claim 1, wherein the plurality of nodes comprises a relay station and at least one of a base station, a further relay station, and a mobile station, so that a transmission order forms a zigzag pattern of downlink and uplink transmission.

3. A method for transmitting data in a multi-hop system having a plurality of nodes and performing bidirectional data transmission between the nodes, said method comprising the steps of:

grouping a plurality of nodes into a first node group to a fourth node group, and assigning data transmission intervals to the grouped node groups at each frame, the data transmission intervals dividing each frame into predetermined time periods;

receiving, by at least one second node of the second node group (hereinafter "a second group node"), data from an upper group node at a first frame and, at the same time, receiving, by at least one third node of the third node group (hereinafter "a third group node") data from a lower group node, the upper group node of the second group node being at least one first node of the first node group (hereinafter "a first group node"), and the lower group node of the third group node being at least one fourth node belonging to the fourth node group (hereinafter "a fourth group node"), and the second group node and the third group node being located within a transmission range of both the upper group node and the lower group node; and transmitting, by the second group node, data to the first group node at a second frame and, at the same time, transmitting, by the third group node, data to the fourth group node and within respective single ranges without being located in an overlapping reception region.

4. The method of claim 3, further comprising:

transmitting, by the second group node, data to the third group node at a third frame and, at the same time, transmitting, by the first group node, data to an upper group node so that a transmission order forms a zigzag pattern of downlink and uplink transmission; and receiving, by the third group node, data from the second group node at the third frame and, at the same time, receiving, by the fourth group node, data from a lower group node, the third group node being located outside the transmission range of the first group node, and the fourth group node being located outside the transmission range of the second group node.

5. The method of claim 4, further comprising:

transmitting, by the third group node, data to the second group node at a fourth frame and, at the same time, transmitting, by the fourth group node, data to the lower group node so that a transmission order forms a zigzag pattern of downlink and uplink transmission; and receiving, by the second group node, data from the third group node at the fourth frame and, at the same time, receiving, by the first group node, data from the upper group node, the second group node being located outside the transmission range of the fourth group node, and the first group node being located outside the transmission range of the third group node.

6. The method of claim 5, wherein the plurality of nodes comprises a relay station and at least one of a base station, a further relay station, and a mobile station.

7. The method of claim 5, wherein the upper group node of the first group node comprises the fourth group node, and the lower group node of the fourth group node comprises the first group node.

8. The method of claim 5, wherein the first group node comprises a $4n^{th}$ node (where n is a natural number equal to or greater than 0), the second group node comprises a $4n+1^{th}$ node, the third group node comprises a $4n+2^{th}$ node, and the fourth group node comprises a $4n+3^{th}$ node.

9. The method according to claim 3, comprising controlling data transmission intervals for transmission to or reception from the plurality of nodes in order to avoid interference noise upon receiving data by one or more of the plurality of nodes.

10. A multi-hop system having a plurality of nodes, and performing bidirectional data transmission between the nodes comprising:

a first node of a plurality of nodes; and a second node of the plurality of nodes, wherein the first node receives data from an upper node at a first frame and, at the same time, the second node receives data from a lower node, the first node and the second node being located within a transmission range of both the upper node, and the first node transmits data to the upper node at a second frame and, at the same time, the second node transmits data to the lower node and wherein the first node and second node are adjacently located to each other and within respective single ranges of transmission of the upper node and the lower node, without being located in an overlapping reception region.

11. The system of claim 10, wherein the plurality of nodes comprises a relay station and at least one of a base station, a further relay station, and a mobile station, so that a transmission order forms a zigzag pattern of downlink and uplink transmission.

12. The system of claim 10, comprising means for controlling data transmission intervals for transmission to or reception from the plurality of nodes in order to avoid interference noise upon receiving data by one or more of the plurality of nodes.

13. A multi-hop system having a plurality of nodes and performing bidirectional data transmission between the nodes comprising:

a first group node of a node group grouped by $4n^{th}$ nodes (where n is a natural number equal to or greater than 0) among a plurality of nodes;

a second group node of a node group grouped by $4n+1^{th}$ nodes and being a lower group node of the first group node;

a third group node of a node group grouped by $4n+2^{th}$ nodes, being a lower group node of the second group node, the second group node and the third group node being located within a transmission range of both the first group node and the fourth group node and within respective single ranges without being located in an overlapping reception region; and a fourth group node of a node group grouped by $4n+3^{th}$ nodes and being a lower group node of the third group node;

wherein the second group node receives data from the first group node at a first frame and, at the same time, the third group node receives data from the fourth group node, wherein the second group node transmits data to the first group node by a second frame and, at the same time, the third group node transmits data to the fourth group node, and wherein each of the frames is divided into data transmission intervals in time and wherein the second group node and third group node are adjacently located to each other and within respective single ranges of transmission of the upper group node and the lower group node.

14. The system of claim 13, wherein the second group node transmits data to the third group node at a third frame and, at the same time, the first group node transmits data to the fourth group node, so that a transmission order forms a zigzag pattern of downlink and uplink transmission, and wherein the third group node receives data from the second group node at the third frame and, at the same time, the fourth group node receives data from the first group node, the third group node being located outside the transmission of the first group node, and the fourth group node being located outside the transmission range of the second group node.

15. The system of claim 13, wherein the third group node transmits data to the second group node at a fourth frame and, at the same time, the fourth group node transmits data to the first group node so that a transmission order forms a zigzag pattern of downlink and uplink transmission, and wherein the second group node receives data from the third group node at the fourth frame and, at the same time, the first group node receives data from the fourth group node, the second group node being located outside the transmission of the fourth group node, and the first group node being located outside the transmission range of the third group node.

16. The system of claim 15, wherein the plurality of nodes comprises a relay station and at least one of a base station, a further relay station, and a mobile station.

17. The system of claim 13, comprising means for controlling data transmission intervals for transmission to or reception from the plurality of nodes in order to avoid interference noise upon receiving data by one or more of the plurality of nodes.

* * * * *